March 3, 1953  L. L. SUTHERLAND  2,629,954
ADVERTISING AND DISPLAY DEVICE
Filed May 26, 1950

INVENTOR.
Lyndall L. Sutherland
BY
Clarence J. Loftus
Atty.

Patented Mar. 3, 1953

2,629,954

UNITED STATES PATENT OFFICE 2,629,954

ADVERTISING AND DISPLAY DEVICE

Lyndall L. Sutherland, Peoria, Ill.

Application May 26, 1950, Serial No. 164,496

2 Claims. (Cl. 40—126)

This invention relates to advertising and display devices and has particular reference to a display device designed for use in promoting the sale of beverages, particularly soft drinks, beer, fruit juices, or any other beverages that are sold in glass bottles and often consumed directly therefrom.

It is the primary object of the invention to provide an advertising display device so arranged and constructed as to accurately simulate the appearance of a person drinking a beverage directly from a bottle.

A further object is to provide a display device simulating the appearance of a person drinking beverage directly from a bottle, together with means for introducing bubbles into the liquid in the bottle to add motion, color and interest to the display, and to provide an unusually lifelike illusion, closely corresponding to the actual appearance of an actual person consuming the advertised product.

A further object of the invention is to provide an advertising display device simulating the appearance of a person drinking a beverage directly from the bottle, with novel means for illuminating the display to concentrate the attention of the observers on the product advertised, and to attract the attention of passers-by to the display.

A further object is to provide a display device of the general character indicated above, together with background and supplementary display surfaces, as for example a base portion which may be representative of the appearance of a typical beverage cooler or refrigerator unit, to further suggest the advertised product to the mind of the observer, and to provide an appropriate space for display of the maker's trade-mark or advertising copy.

In the preferred form of the invention illustrated herein, the foregoing objects are accomplished by the provision of a display device having an enlarged base and a generally flat plaque portion supported thereon with a three-dimensional figurine formed on the plaque and illustrated in connection with a transparent bottle partially filled with liquid and positioned at the lips of the figurine. The bottle is provided with a concealed and illuminated bubble generator to cause bubbles to rise in the neck of the bottle, so that the display not only simulates the appearance of a person drinking from a bottle with dramatic effect, but provides changing illumination effects and an appearance of motion which obviously draw attention to the device.

The invention is best described in connection with the drawings of the present application, wherein.

Figure 1:
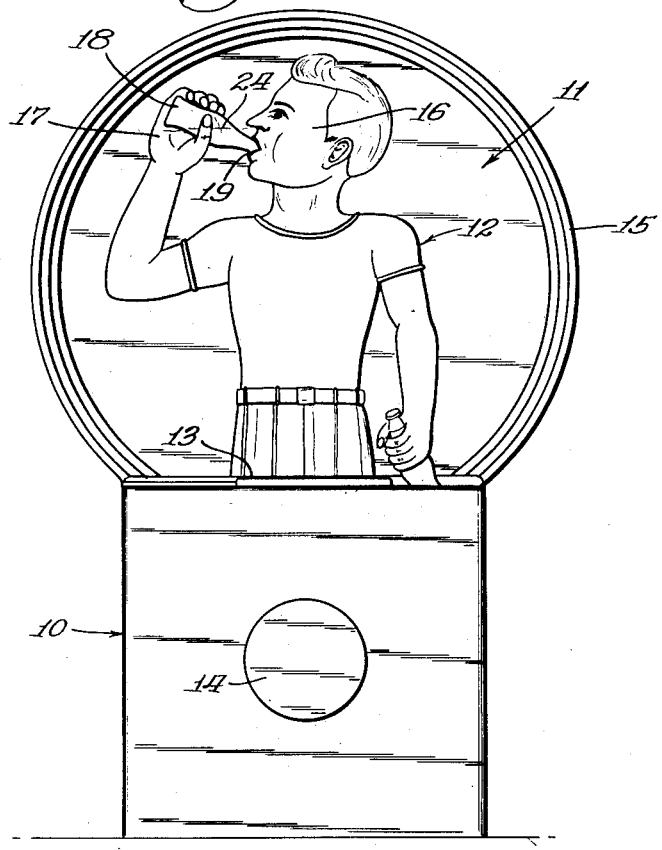
Figure 1 is a front elevational view of an advertising and display device according to the present invention.
Figure 2:
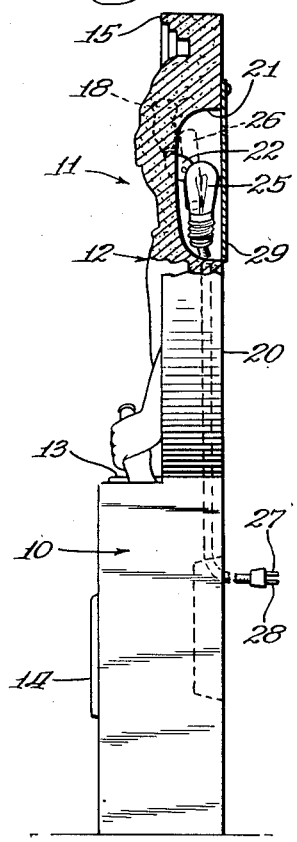
Figure 2 is a side elevational view thereof, with the upper part of the device shown in section to illustrate its internal construction.
Figure 3:
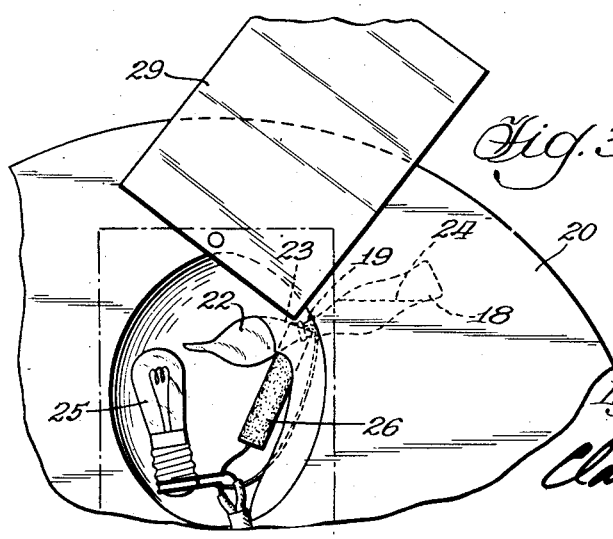
Figure 3 is a fragmental rear elevational view of the upper portion of the plaque and figurine.
Figure 4:
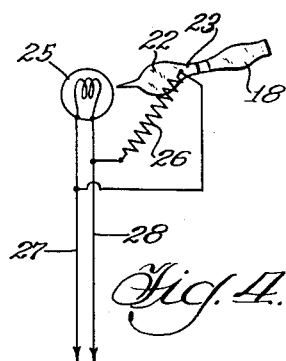
Figure 4 is a schematic diagram showing the electrical connections and devices utilized by the illuminated bubble generator of the device.

As illustrated, the device comprises, in general, a base portion 10 with a generally flat plaque portion 11 superimposed thereon and provided with a three-dimensional figurine or statuette 12. Preferably the base 10 is of generally rectangular configuration and shaped to simulate a bottle cooler of one of the types conventionally used for merchandising soft drinks. If desired, this characteristic appearance may be increased by the provision of features such as ordinarily used on bottle coolers and the like, as for example, the slidable top door 13 and the raised panel 14 on which the trade-mark of the manufacturer may be conspicuously displayed.

The plaque 11 may have a marginal rim 15, if desired, and it is contemplated that the base, plaque and figurine may all be formed integrally as by a molding or casting process. These may be formed of various materials without departing from the scope of the present invention, although it is preferred to use a relatively light, inexpensive and opaque material such as plaster or the like.

The figurine 12 includes a face portion 16 having a representation of a person's features thereon and, as shown, the figurine includes a hand 17 spaced outwardly from the face and slightly above the lips thereof, so that it supports a transparent bottle 18, the neck portion 19 of which extends to the lips of the figurine.

The rear surface 20 of the plaque 11 is recessed at 21 at a point immediately behind the face 16 of the figurine. Within this recess there is provided a bubble generator, comprising a small vial 22 sealed to the neck portion 19 of the bottle 18 by a bubble duct 23. The vial 22 and bottle 18 are filled to an intermediate level indicated at 24, with volatile liquid such as grain alcohol. The vial and bottle are sealed under reduced atmospheric pressure, so that the liquid will readily vaporize in the presence of moderate heat.

The vial 22 is heated by an incandescent lamp 25 and resistor 26 which are connected in parallel across the leads 27 and 28 of an electric supply cord. If desired, the recess 21 may be covered as by the plate 29.

The incandescent lamp 25 is positioned in fairly direct alignment with the longitudinal axis of the bottle 18, so that when illuminated it will project rays of light outwardly through the vial 22 and through the neck of the bottle. Also, when the lamp 25 and resistor 26 are energized, the heat they develop will cause vaporization of the fluid within the bubble generator vial 22, and this vapor, escaping through the duct 23, will bubble upwardly within the neck 19 of the bottle so that the display will accurately simulate the appearance of a person consuming beverage directly from the bottle in which it is sold, and the light refracted from the bubbling liquid will attract attention to the display.

Obviously, the bottle 18 may be formed to simulate the characteristic shape of bottles employed by the manufacturer using the device to advertise his products, and the liquid within the bottle may be colored to a corresponding shade. When so constructed and arranged, the device gives a very effective illusion, since the motion of the bubbles within the neck of the bottle and the illumination concentrated thereon serve not only to attract attention to the display, but to cause the observer to center his attention on the features most characteristic of the product advertised. Thus by the present teachings, a comparatively simple, inexpensive and easily manufactured device creates a novel illusion which is attention compelling in nature and at the same time directs the attention of the observer to the product advertised.

Having thus described my invention, what I claim as new and desire to secure by United States Letters Patent is:

1. As an article of manufacture, a beverage advertising and display device comprising, in combination, a figurine in the form of a face having a representation of lips thereon, and an up-ended transparent beverage bottle having its neck at the lips of the figurine and extending outwardly therefrom; together with a bubble generator concealed within said figurine, the longitudinal axis of said bottle and bubble generator extending diagonally upwardly through the figurine from the rear face portion thereof to the forward face portion whereby the major portion of said bottle may be seen only from the front of said figurine and said bubble generator may be seen only from the rear of said figurine and a bubble duct extending from said generator between the lips of the figurine and connected with the neck of said bottle, whereby bubbles produced by said generator may be discharged upwardly through liquid partially filling said bottle; said bubble generator comprising a vial of volatile liquid sealed to said bubble duct and bottle under reduced atmospheric pressure, and a heater adjacent the vial; with a light source within the figurine positioned to project rays of light through said bubble duct to the neck portion of the beverage bottle said bubble generator and light source being located behind the figurine, and said light source being in substantial axial alignment with said bottle and bubble duct whereby when said light source is illuminated light rays will be projected in an upwardly diagonal direction from the rear face of the figurine to the contents of the bottle on the opposite forward face of the figurine.

2. As an article of manufacture, a beverage advertising and display device comprising, in combination, a figurine in the form of a face having a representation of lips thereon, and an up-ended transparent beverage bottle having its neck at the lips of the figurine and extending outwardly therefrom; together with a bubble generator concealed within said figurine, the longitudinal axis of said bottle and bubble generator extending diagonally upwardly through the figurine from the rear face portion thereof to the forward face portion whereby the major portion of said bottle may be seen only from the front of said figurine and said bubble generator may be seen only from the rear of said figurine, and a bubble duct extending from said generator between the lips of the figurine and connected with the neck of said bottle, whereby bubbles produced by said generator may be discharged upwardly through liquid partially filling said bottle; said bubble generator comprising a vial of volatile liquid sealed to said bubble duct and bottle under reduced atmospheric pressure, and a heater adjacent the vial said bubble generator and light source being located behind the figurine, and said light source being in substantial axial alignment with said bottle and bubble duct whereby when said light source is illuminated light rays will be projected in an upwardly diagonal direction from the rear face of the figurine to the contents of the bottle on the opposite forward face of the figurine.

LYNDALL L. SUTHERLAND.

REFERENCES CITED

The following references are of record in the file of this patent:

UNITED STATES PATENTS

| Number | Name | Date |
|---|---|---|
| 598,396 | Steinhauser | Feb. 1, 1896 |
| 1,977,093 | Sechi | Oct. 16, 1934 |
| 2,031,409 | Fioravanti | Feb. 18, 1936 |
| 2,033,658 | Stephenson | Mar. 10, 1936 |
| 2,174,446 | Otis | Sept. 26, 1939 |
| 2,288,956 | Rosenkoetter | July 7, 1942 |
| 2,315,240 | Ashenberg | Mar. 30, 1943 |